Feb. 1, 1944.  J. GABEL  2,340,418
AUTOMATIC PHONOGRAPH
Filed Aug. 30, 1940  9 Sheets-Sheet 1

Inventor:
John Gabel

By: Evans, Pond + Anderson
Attorneys.

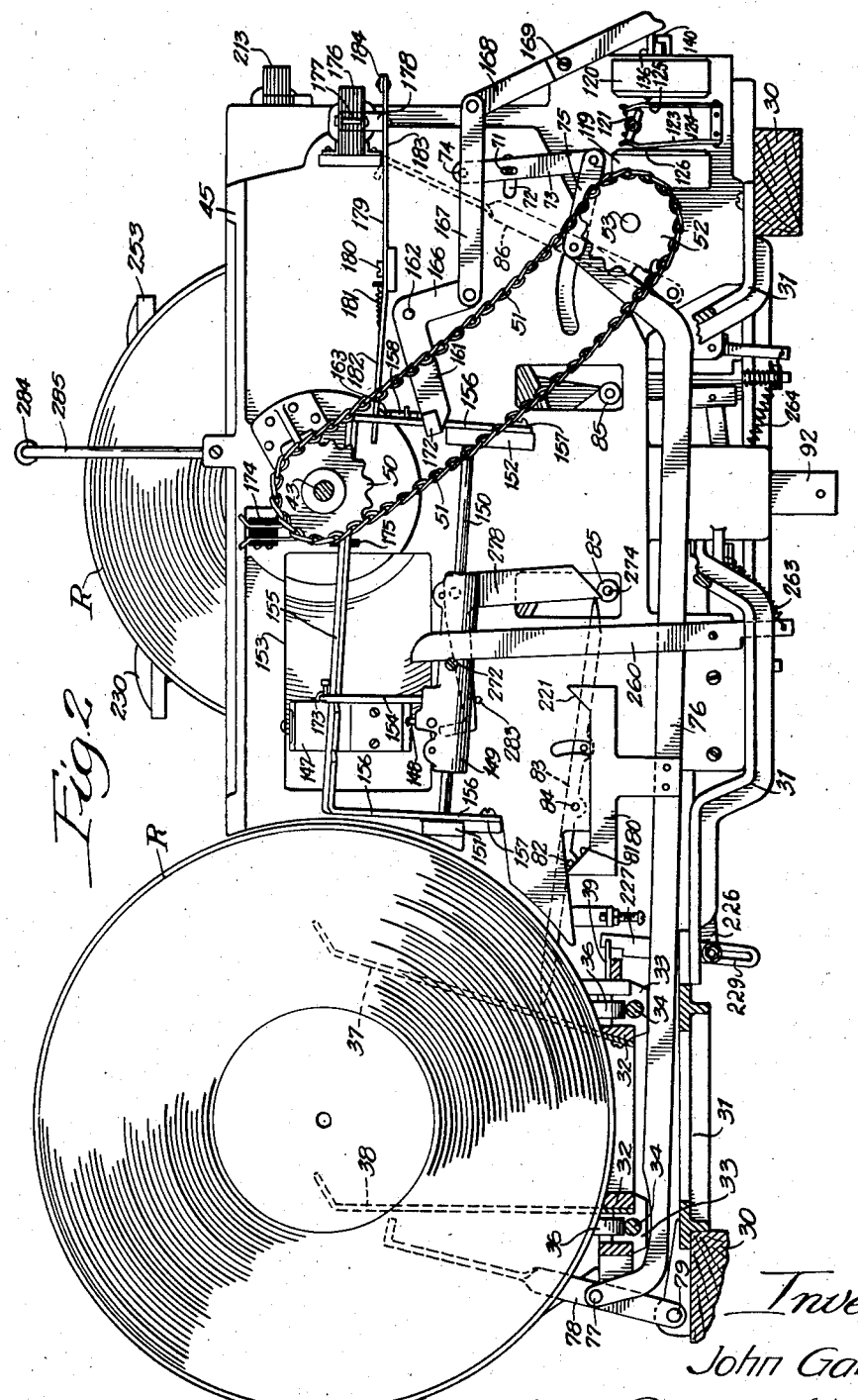

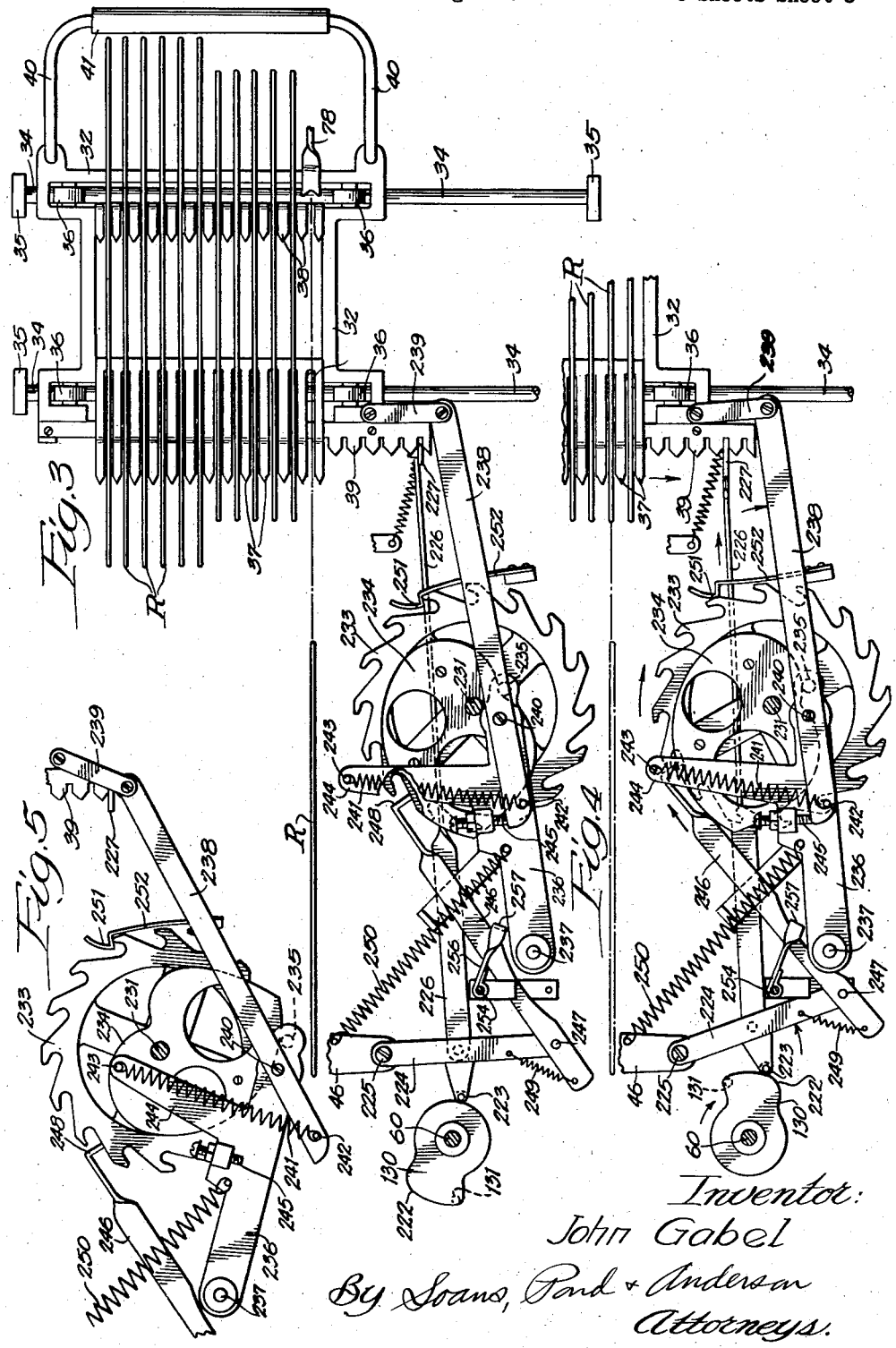

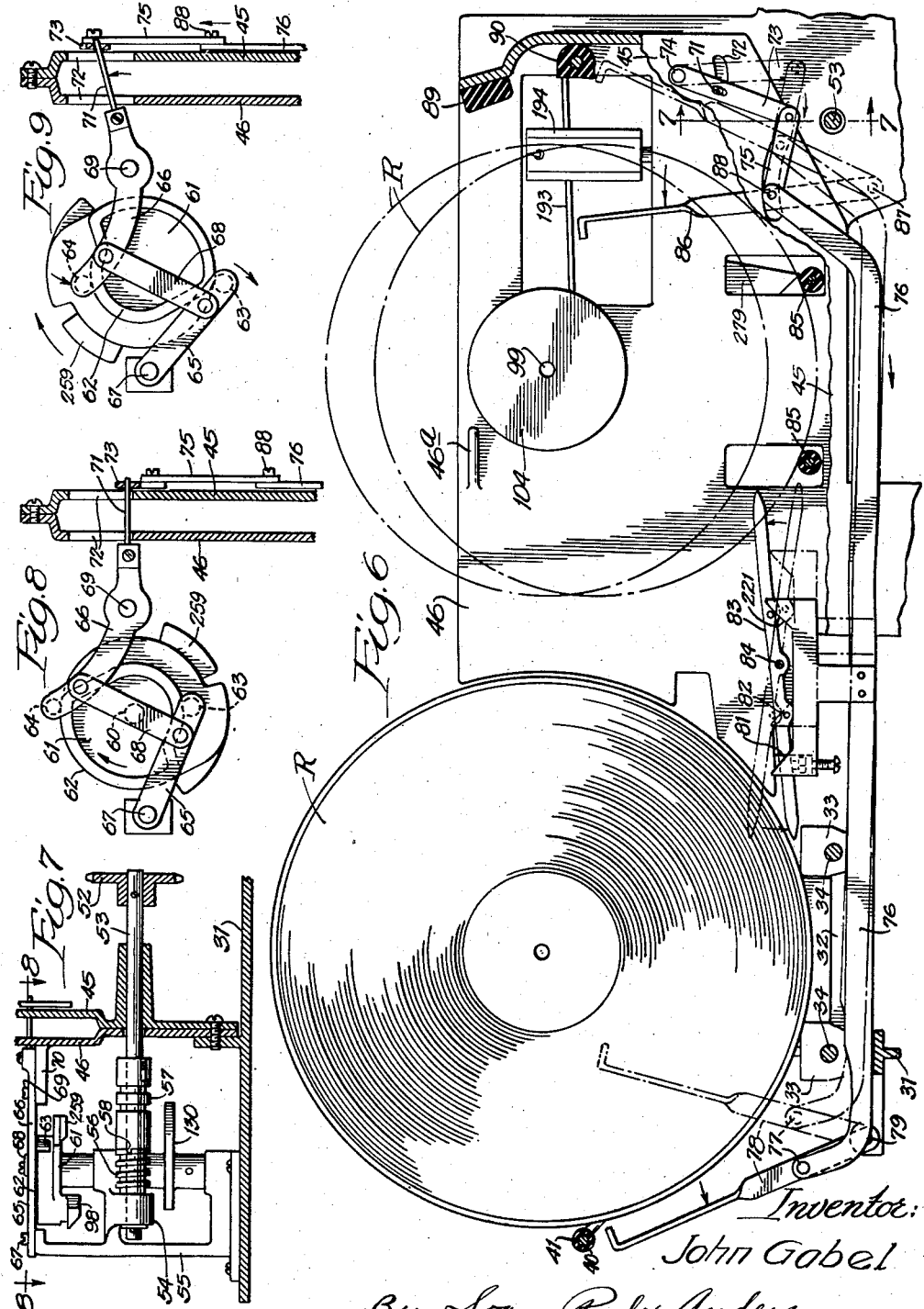

Feb. 1, 1944. J. GABEL 2,340,418
AUTOMATIC PHONOGRAPH
Filed Aug. 30, 1940 9 Sheets-Sheet 5

Inventor:
John Gabel
By Soans, Pond & Anderson
Attorneys

Feb. 1, 1944.  J. GABEL  2,340,418
AUTOMATIC PHONOGRAPH
Filed Aug. 30, 1940  9 Sheets-Sheet 6
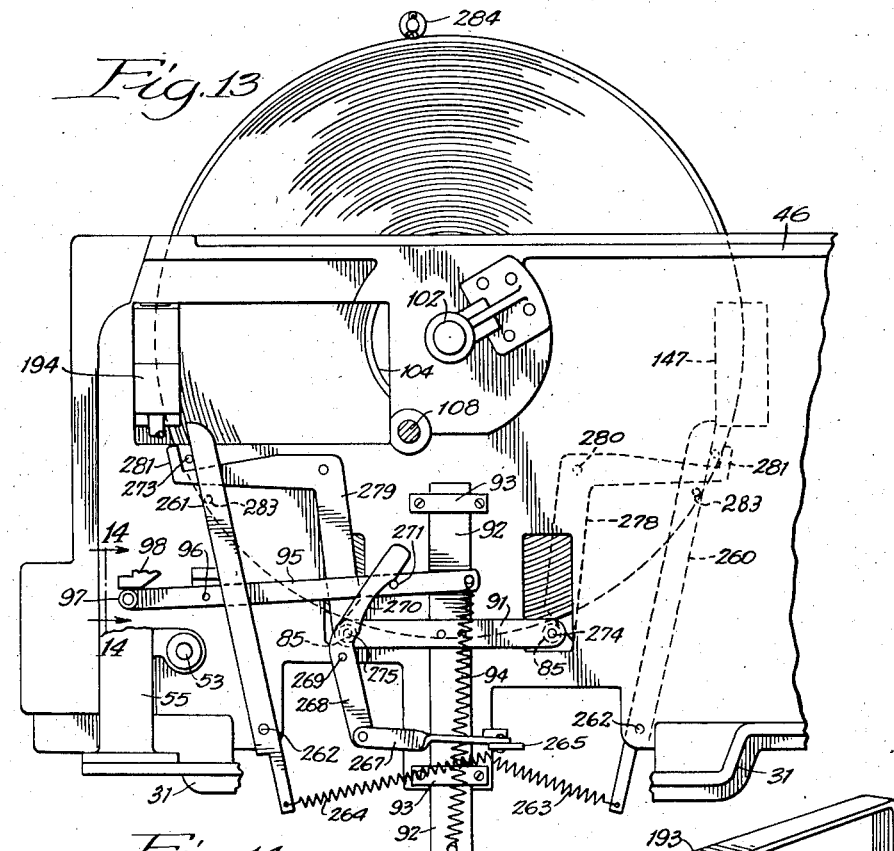
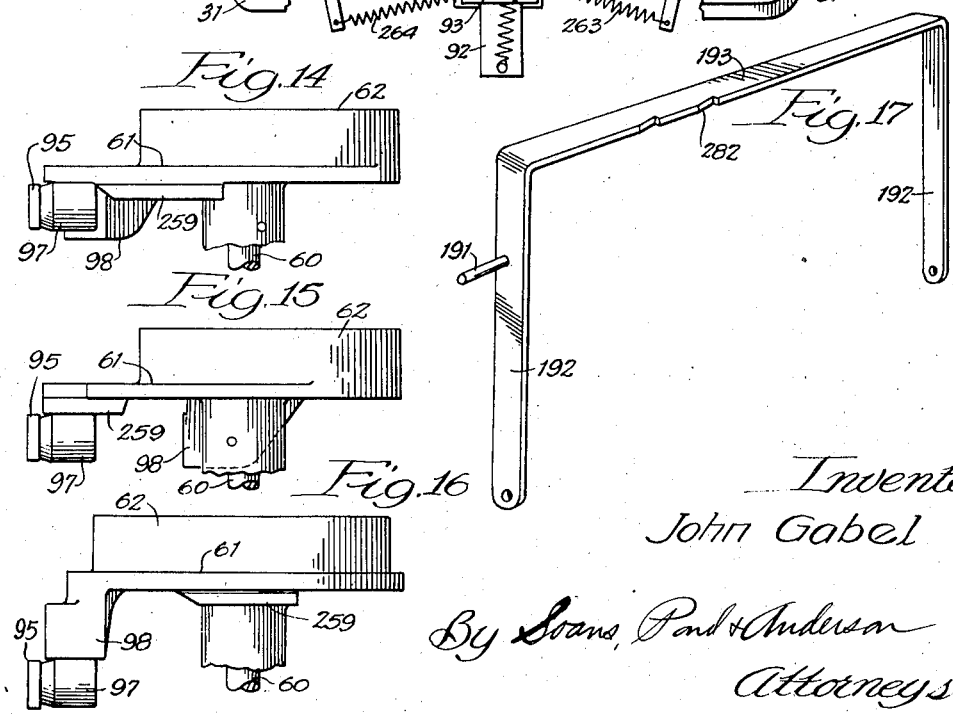
Inventor
John Gabel
By Soans, Pond & Anderson
Attorneys

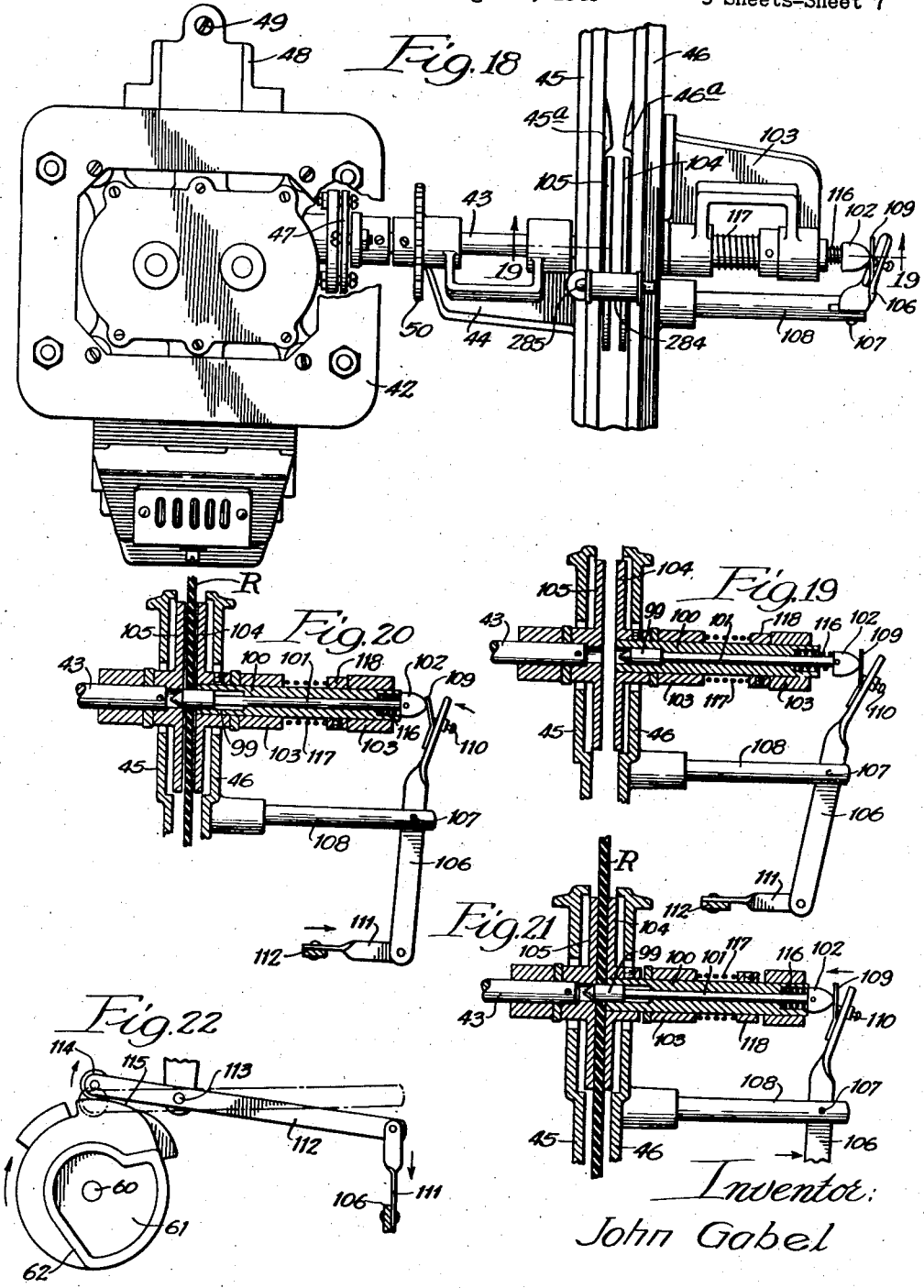

Feb. 1, 1944.                     J. GABEL                     2,340,418
                            AUTOMATIC PHONOGRAPH
                           Filed Aug. 30, 1940            9 Sheets-Sheet 8

Inventor:
John Gabel
By Soans, Pond & Anderson
Attorneys

Feb. 1, 1944.  J. GABEL  2,340,418
AUTOMATIC PHONOGRAPH
Filed Aug. 30, 1940   9 Sheets-Sheet 9
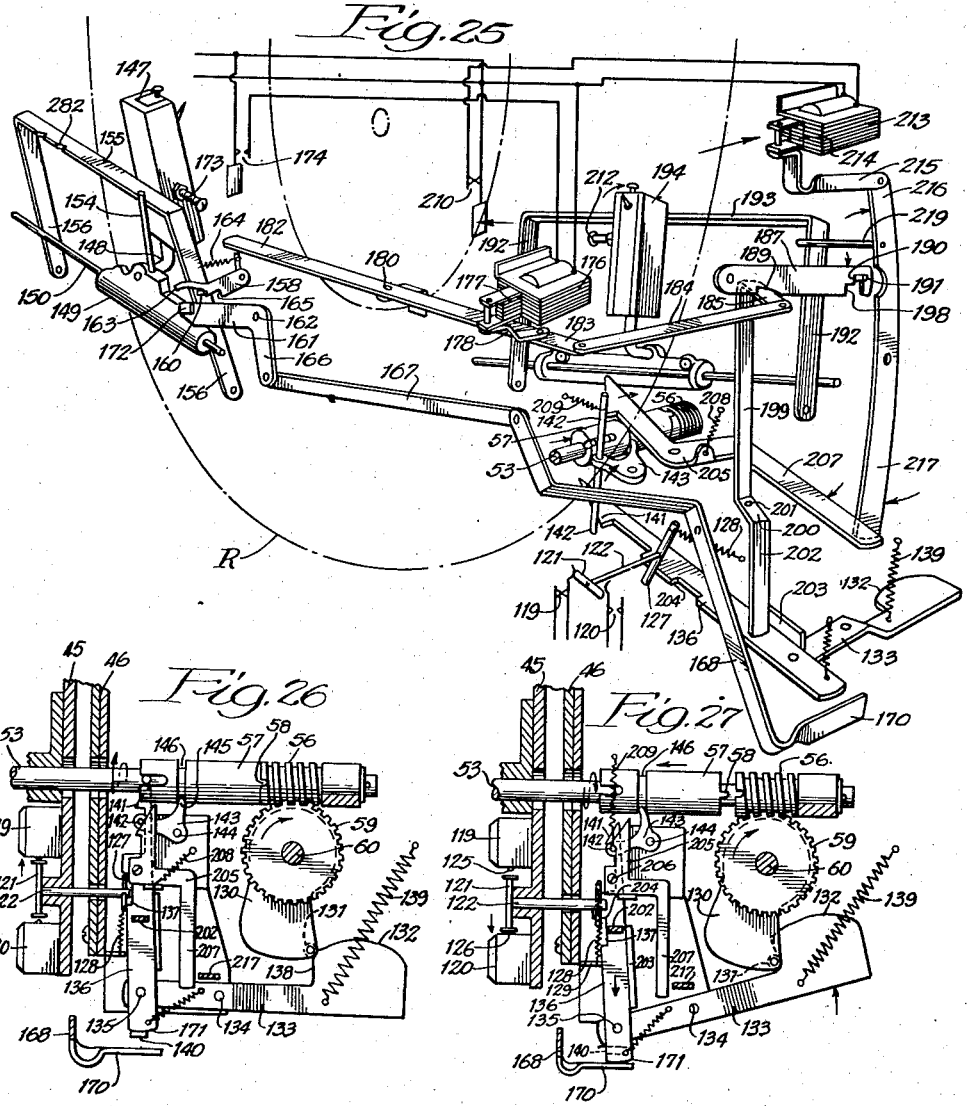
Inventor:
John Gabel
By Soans, Pond & Anderson
Attorneys.

Patented Feb. 1, 1944

2,340,418

UNITED STATES PATENT OFFICE 2,340,418

AUTOMATIC PHONOGRAPH

John Gabel, Evanston, Ill., assignor to The John Gabel Manufacturing Company, Chicago, Ill., a corporation of Illinois Application August 30, 1940, Serial No. 354,868

13 Claims. (Cl. 274—10)

This invention relates to automatic phonographs, that is to say, phonographs wherein records are automatically moved from a storage magazine to playing position, reproduced and then returned to the magazine, and in which any desired record contained in the magazine may be selected for reproduction.

The main objects of the invention are to provide an automatic instrument of the character indicated wherein records having selections recorded on both faces may be reproduced, first on one face and then on the other face, with little or no interruption; to provide an arrangement in which shifting or turning of the record as a requirement for reproducing both faces is eliminated; to provide an instrument wherein records of different sizes may be reproduced indiscriminately one after the other and without any preadjustment to accommodate any specific size of record; to provide improved means for shifting records from a magazine to playing position and back again; to provide mechanism of relatively simple but durable character and which is compact and relatively inexpensive to make; and other objects and advantages of the invention will be understood by reference to the following specification and accompanying drawings (9 sheets) wherein there is illustrated an automatic phonograph embodying a selected form of the invention.

In the drawings:

Figure 2 is a side elevation of the side opposite to that shown in Figure 1;

Figure 3 is a fragmentary plan section as represented by the line 3—3 on Figure 1;

Figures 4 and 5 are fragmentary plan sections corresponding to a portion of Figure 3 but showing changed positions of the mechanism;

Figure 6 is a longitudinal section on a plane corresponding substantially to the plane occupied by a record in reproducing position in the apparatus;

Figure 7 is a section on the line 7—7 of Figure 6;

Figure 8 is a section on the line 8—8 of Figure 7;

Figure 9 is a section corresponding to Figure 8 but showing a changed position of the parts;

Figure 13 is a side elevation similar to Figures 10 and 11 but showing another changed position;

Figures 14, 15 and 16 are side elevations of certain cam mechanism;

Figure 17 is a perspective illustrating a detail of construction;

Figure 18 is a fragmentary top plan as represented by the line 18—18 on Figure 1;

Figure 19 is a section on the line 19—19 on Figure 18;

Figures 20 and 21 are sections similar to Figure 19 but showing changed positions of the parts;

Figure 22 is a fragmentary plan illustrating the arrangement for operating the mechanism shown in Figures 19 to 21, inclusive;

Figures 23, 24 and 25 are perspective illustrations of certain elements of operating mechanism;

Figure 26 is a fragmentary section approximately on the line 26—26 on Figure 1 but turned 90° in a horizontal plane; and Figure 27 is a section similar to Figure 26 but showing a changed position of the parts.

Figure 1:
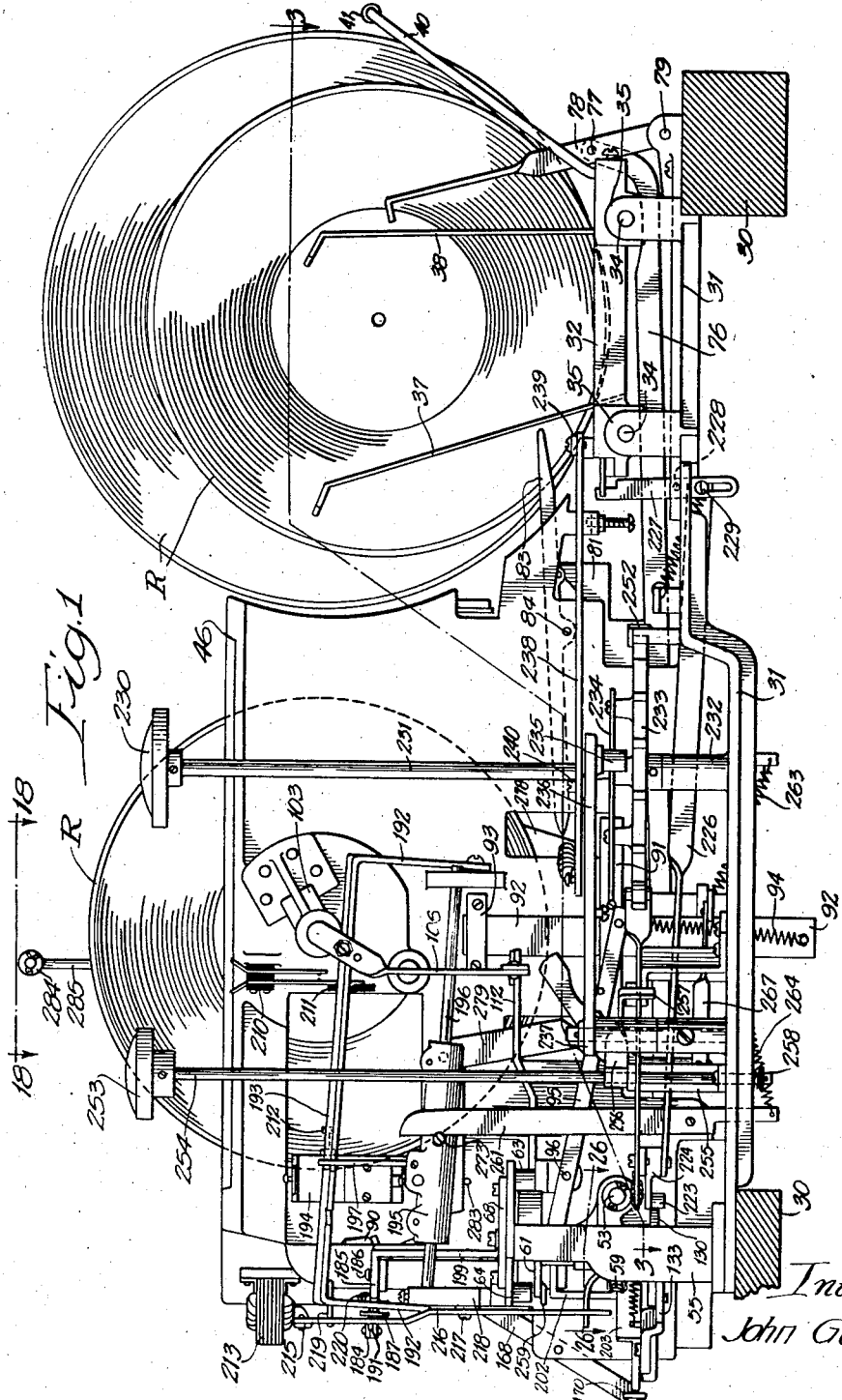
Figure 1 is a side elevation.

Referring now to the drawings, the mechanism therein shown is illustrated without reference to an enclosing cabinet such as would ordinarily be employed for housing the same, except to the extent that supporting members 30, 30 which may be assumed to constitute parts of a cabinet are illustrated.

The main supporting frame of the apparatus is designated 31, the same being conveniently in the form of a metal casting, although it will be apparent that it may be of any other suitable construction. The said frame 31 underlies the mechanism and has end portions seated on the supporting members 30, 30 and suitably secured thereto, for example, by conventional wood screws, or otherwise.

A record magazine is provided, the same comprising a frame 32 which is formed with suitable depending ears 33, 33 which are apertured so as to slidably fit on supporting rods 34, the latter being mounted at their ends in upstanding ears or lugs 35 formed integral with the frame 31. The record magazine frame 32 is also suitably formed to rotatably support rollers or wheels 36 which are adapted to ride on the supporting rods 34 so as to permit the magazine to be easily shifted in a horizontal direction along said rods. Because of the roller support of the magazine on the rods, a minimum of force is required to shift the same and by providing the apertured ears 33, 33 for receiving the rods 34, 34, unauthorized removal of the magazine is made quite difficult.

The magazine frame 32 has secured to it front and rear rows 37 and 38, respectively, of spaced fingers between which phonograph records of the disc type are adapted to be positioned in regularly or uniformly spaced relation. The records are supported by engagement with portions of the frame 32 as best shown in Figure 2. For a purpose which will presently appear, there is secured to the front of the record magazine frame 32, a notched bar 39 which is equipped with spaced notches corresponding respectively with the record spaces between adjacent fingers 37 and 38 of the record magazine. A guard 40 having a rubber or other cushion 41 thereon is provided at the rear or outside of the record magazine for preventing accidental movement of the records rearwardly out of the magazine.

Assuming that the record magazine is in predetermined position for the reproducing of a selected record, the apparatus is set in operation by energizing an electric motor 42 (see Figure 18) which drives a shaft 43, the latter being journalled for rotation in a suitable bearing bracket 44 formed integral with or secured to a vertically disposed side plate 45. The side plate 45 is complementary to another side plate 46, and said side plates extend upwardly from the main frame 31 and they may be formed integral therewith or secured thereto in any suitable manner.

The shaft 43 is connected to the motor 42 through the agency of a suitable flexible connection 47, and the speed of rotation of the shaft 43 may be varied somewhat by suitably adjusting a governor built into the motor 42 at 48 and adapted to be adjusted through the agency of an adjusting screw 49 (see Fig. 18).

The shaft 43 has secured to it a sprocket 50 which engages a chain 51 for driving the same, and said chain engages another sprocket 52 carried by a shaft 53, so that the shaft 53 is driven from the shaft 43.

The shaft 53 is suitably journalled for rotation in a bearing boss, formed integrally with the side plate 45 (see Figure 7) and in a suitable bearing boss 54, formed as a part of a bracket 55 which is mounted on the main frame part 31.

The shaft 53 has rotatably journalled thereon a worm gear 56 and a clutch member 57, the latter being keyed to the shaft 53 so as to be slidable longitudinally of the shaft and rotatable therewith. The clutch member 57 is equipped with a clutch tooth 58 adapted to enter a corresponding slot or notch in the worm gear 56, so that rotation of the shaft 53 may, at selected times, be imparted to the worm gear 56.

The worm gear 56 meshes with a worm wheel 59 which is secured to a vertically disposed shaft 60, the latter being journalled for rotation in in suitable bearings formed integrally with the bracket 55 (see Figs. 7 and 26).

The shaft 60 has secured to it a cam disc 61 which is provided on its upper face with an upstanding cam flange 62, which acts on rollers 63 and 64 carried by the free ends of levers 65 and 66, respectively. The lever 65 is pivotally mounted at its other end as shown at 67 on a portion of the bracket 55 and it is connected by means of a link 68 to the other lever 66. The lever 66 is pivoted intermediate its ends as shown at 69 on a lug 70 projecting from the side member 46, and the free end of said lever 66 is equipped with a pin extension 71 which projects through suitable openings 72, 72 in the members 45 and 46.

The outer end of the pin extension 71 of the lever 66 enters an opening in a lever 73 (see Figure 6) which lever is pivoted at its upper end as shown at 74 on the side member 45. The lower end of said lever 73 is connected by means of a link 75 to the adjacent end of another link 76, the opposite end of which is pivoted as shown at 77 to a record-propelling arm 78.

The arm 78 is pivoted at its lower end as shown at 79 on a portion of the frame 31, and the upper end of said lever 78 is bifurcated or forked, as best indicated in Figure 3, so as to be adapted to engage the periphery of a record to advance the same in the direction of the plane of the record. The arm 78 is of such a width that it may be swung inwardly between alternate records for the purpose of advancing an intermediate record.

Incident to the movement of the link 76 in a forward direction for advancing a record from the record magazine, a cam member 80, carried by the link 76, is also advanced in the same direction (see Figure 6) so that a cam formation 81 thereon will engage a pin 82 projecting laterally from a record-track element 83. The track element 83 is pivoted intermediate its ends as shown at 84 between the side plates 45 and 46. The relationship of the cam 81 to the movement of the record-advancing arm 78 is such that the cam 81 will cause the track 83 to be rocked at about the time the center of the record is directly above the end of the track which is adjacent the record magazine. Thus the record will be elevated slightly and caused to roll by gravity down the track 83 which is then inclined as indicated in broken lines in Figure 6.

The record, assuming it to be a 10" record, will come to rest on a pair of rubber or cushion-covered supporting studs 85, 85 which traverse the space between the side members 45 and 46 between which the record is advanced by the means described. By reference to Figures 2 and 6, it will be seen that there is also provided a record-moving arm 86 which is pivotally mounted adjacent its lower end as shown at 87 between the side members 45 and 46, the upper end of said arm being forked for engagement with the periphery of the record. The member 86 is employed as will hereinafter be pointed out for initiating return movement of the record. Said arm 86 is connected as shown at 88 to the actuating links 75 and 76, so that it rocks in unison with the record-advancing arm 78 but in the opposite direction.

Rubber or other cushioned bumpers 89 and 90 are provided between the side members 45 and 46 for engagement with the peripheries of the records, which, upon delivery to playing position, initially tend to roll past the supporting members 85, 85. Said cushions 89 and 90 are so positioned that they permit limited excess travel of the records and serve to cause the same to return to position on the supports 85, 85 as an incident to the rebound from the said cushions. The cushion member 90 is especially adapted to engage the 10" size records, while the upper cushion 89 is particularly adapted to engage the larger, or 12" records.

Figure 10:
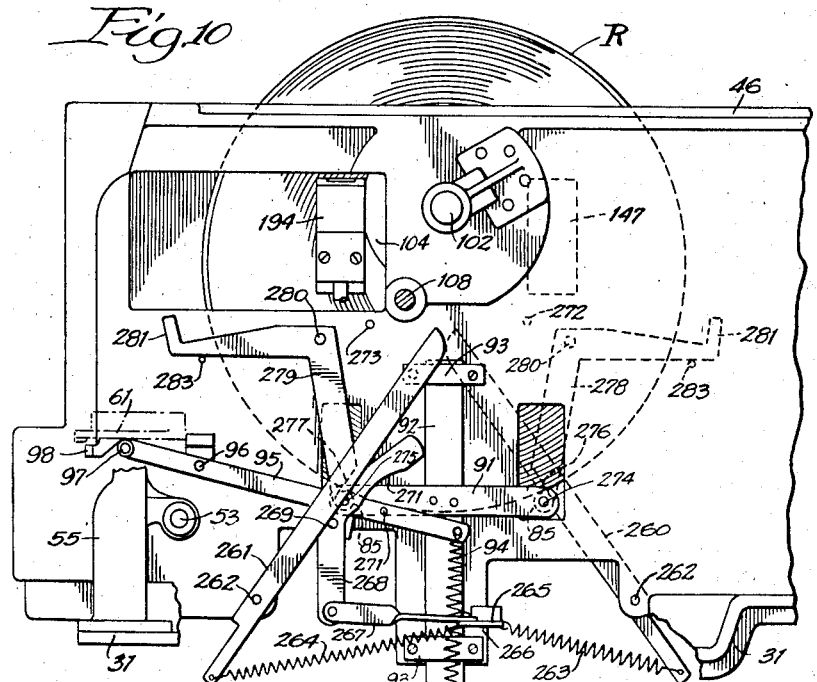
Figure 10 is a fragmentary side elevation corresponding to a portion of Figure 1.
Figure 11:
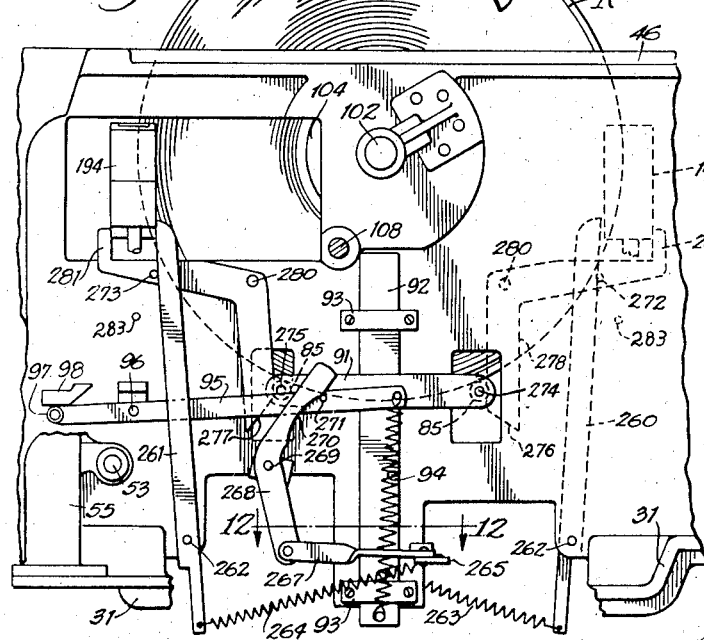
Figure 11 is a side elevation similar to Figure 10 but showing a changed position.
Figure 12:
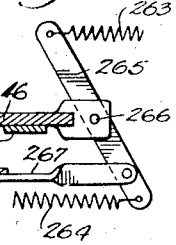
Figure 12 is a section on the line 12—12 of Figure 11.

The record supporting members 85, 85 are carried by the ends of a cross-arm 91 (see Figures 1, 10, 11 and 13) which is secured to a vertically slidably mounted post 92. As best shown in Figures 10, 11 and 13, the post 92 is slidably mounted adjacent its upper and lower ends in suitable guide-ways formed by straps 93, 93 which are secured to the side member 46. The post 92 is connected through the agency of a coil spring 94 to the adjacent end of a lever 95 which is pivotally mounted intermediate its ends as shown at 96 on a suitable boss formed on the side member 46. The other end of said arm 95 is equipped with a cam-following roller 97 which is adapted to be actuated by a cam formation 98, carried by the bottom side of the cam disc 61.

The cam formation 98 is so positioned on the cam disc 61 that after the record designated R has come to rest on the supporting studs 85, 85, the arm 95 will be rocked so as to transmit upward movement to the post 92, such movement being transmitted through said spring 94. The spring 94 is of sufficient strength that it will not stretch when lifting the weight of the parts elevated thereby (including the record R), and the throw of the cam 98 is such that a 10″ record will be elevated to a predetermined extent so as to align its usual center opening with a centering pin 99 (see Figures 18 to 21, inclusive).

The centering pin 99 is slidably mounted within a tubular shaft 100 and it has an extension 101 which terminates in a headed end 102 outside of the tubular shaft 100. The tubular shaft 100 is journalled in suitable bearings carried by a bracket 103 which is formed integrally with or secured to the side plate 46 and said tubular shaft is equipped at its inner end with a flange or disc member 104.

The disc member 104 is adapted to cooperate with a disc member 105 which is secured to the adjacent end of the driven shaft 43, to clamp between them a record so that the record will be rotated as an incident to the rotation of said shaft 43. As shown in Figures 19 to 21, inclusive, the side members 45 and 46 are formed with suitable recesses to provide clearance between the outer faces of said discs and the inner faces of said side members 45 and 46.

When the record is elevated to its proper position by the means already described, the centering pin 99 is first moved inwardly so as to pass through the usual center opening in the record, thereby to position the record accurately, the inner end of the centering pin 99 being suitably pointed as shown to facilitate such action, even though the record may be slightly off-center when supported merely on the supporting studs 85, 85. After the record is centered, the disc 104 is yieldingly pressed inwardly so as to resiliently clamp the record against the driven disc 105 to thereby effect rotation of the record for reproducing purposes. The means for effecting inward movement of the centering pin 101 comprises a lever 106 which is pivotally mounted intermediate its ends as shown at 107 in a suitable post or the like 108, which projects from the side member 46. The upper end of said arm 106 is equipped with a resilient abutment 109, the position thereof being adjustable by means of a set screw 110 carried by the adjacent end of the arm 106. The other end of the arm 106 is connected by means of a link 111 to the adjacent end of a lever 112 which is pivotally mounted intermediate its ends as shown at 113 on a suitable lug projecting from the side member 46 and the other end of the lever 112 is equipped with a roller 114 for engaging a peripheral cam surface 115 formed on the cam disc 61.

It will be seen tht incident to the rotation of the cam 115, the lever 112 will be rocked so as to cause rocking of the lever 106 and consequent inward movement of the centering pin 99. A coil spring 116 serves to resist such inward movement of the centering pin and to withdraw the same when the lever 106 is rocked in the reverse direction.

The headed end 102 of the centering pin is adapted to engage the adjacent end of the tubular shaft 100 after the centering pin 99 has been moved inwardly a distance sufficient to have entered the center opening in the record R, and to have brought the same into its operative, centered position, or nearly thereto. After the headed end 102 of the centering pin is in engagement with the tubular shaft 100, continued rocking movement of the arm 106 serves to transmit inwardly directed endwise movement to the tubular shaft 100. Such movement is resisted by means of a coil spring 117 which bears at one end against one of the bearings for the shaft and at its other end against a collar 118 secured to said shaft. The throw of the cam 115 is such that approximately the proper amount of endwise movement will be imparted to the shaft 100 to adequately clamp the record R against the driven disc 105. However, the resilient element 109 through which the movement of the lever 106 is transmitted to the centering pin and tubular shaft constitutes a safeguard against the application of excessive clamping pressure to the record, so as thereby to avoid danger of damaging the record.

For the purpose of feeding a record from the magazine to reproducing position and for centering and clamping the record in such position, the cam disc 61 is rotated in a clockwise direction as viewed from above, and the motor 42 is likewise driven in a clockwise direction when viewed from the right-hand side thereof, as shown in Figure 18, i. e., when viewed from the side of the mechanism shown in Figure 1. Incident to such rotation of the motor, the record, when clamped between the members 104 and 105 will be rotated in a clockwise direction when viewed as in Figure 1.

For the purpose of reproducing the record on both sides, the left-hand side of the record as viewed in Figures 20 and 21 and the obverse side as viewed in Figure 1 is first played and thereafter the other side. In view of the standard arrangement of the spiral record groove in standard or conventional records, it is accordingly necessary to reverse the direction of rotation of the motor 42 and it is also necessary to stop the rotation of the cam 61 so as to prevent actuation of various mechanism until the playing of the record is completed.

The motor 42 is a suitable type of reversible motor, the direction of rotation thereof being controllable by electric switches 119 and 120 (see Figures 2, 26 and 27), the said switches being suitably connected to the motor so that when one of said switches completes an electric circuit, the motor will be driven in one direction and when the other switch completes another circuit, the motor will be driven in the opposite direction it being understood, of course, that the arrangement is such that only one of said switches completes a circuit at one time.

The switches 119 and 120 are suitably mounted on the side member 46 and they are adapted to be actuated by a cross-arm 121 which is secured to a rock shaft 122. As best shown in Figure 2, the ends of the cross-arm 121 are adapted to engage inwardly humped end portions of flat spring members 123 and 124, respectively, the latter being so shaped that portions thereof are adapted to engage plungers such as indicated at 125 and 126, constituting portions of the respective switches.

The shaft 122 is suitably journalled in a boss provided for that purpose on the side member 45 and it projects through a suitable opening in the other side member 46 and is equipped at its other end with a cross-pin 127 (see Figures 25, 26 and 27).

The upper end of said cross-pin has connected to it a coil spring 128, the other end of which is anchored as indicated at 129 to a portion of the side member 46. Said spring normally urges the shaft 122 to rock in a clockwise direction as viewed in Figure 2, so as to cause the switch 119 to complete an electric circuit which will cause the electric motor 42 to drive the cam disc 61 in the operative or clockwise direction as viewed from above.

For effecting disengagement of the switch 119, closing of the switch 120 so as to reverse the motor, and also to effect disengagement of the clutch member 57 from the driven worm gear 56, there is provided on the cam shaft 60 a member 130, which is provided with a depending roller 131. The roller 131 acts against the periphery 132 of a suitably shaped end portion of a lever 133, the latter being pivotally mounted intermediate its ends as indicated at 134 on a suitable bracket part extending from the side member 46. The lever 133 at its other end has pivoted to it as shown at 135 a member 136. The member 136 is provided with a notch 137 into which the lower end portion of the cross-pin 127 extends.

When the crank pin 131 passes the shoulder 137 forming a part of the periphery 132 of said lever 133, a spring 139 is permitted to rock the lever 133 in a counterclockwise direction when viewed from above as in Figures 26 and 27. Such rocking movement of the lever 133 is limited by a stop shoulder 140 which is formed by an extension of the bracket on which said lever 133 is pivoted. The rocking movement of the lever 133 under the influence of the spring 139 is transmitted to the member 136 so that the pin 127 is engaged by an edge portion of the member 136 at the end of the notch 137 therein, so as to rock the shaft 122 in a counter-clockwise direction when viewed as in Figure 2. Such rocking of the lever 122 is sufficient to rock the cross-arm 121 so as to effect opening of the circuit controlled by the switch 119 and closing of the circuit controlled by the switch 120, so as to thereby reverse the direction of rotation of the electric motor 42.

As an incident to the movement of the member 136 under the influence of the spring 139, a hooked end portion 141 formed integrally therewith engages a pin 142 which extends upwardly from the end of one arm of a bell crank member 143. Said bell crank member 143 is pivoted as indicated at 144 on a portion of the bracket structure on which the lever 133 is pivoted and the other arm 145 of said bell crank enters a circumferential groove 146 formed in the clutch sleeve 57. From an inspection of Figures 26 and 27, it will be apparent that when the member 136 engages the pin 142 in the course of the spring-effected movement of the member 136, the bell crank 144 will be caused to rock in such a direction that its arm 145 will disengage the clutch sleeve 57 from the worm gear 56, thereby stopping the further rotation of the shaft 60 and the cam members carried thereby.

The record R having thus been transmitted from a storage magazine to operative or reproducing position, and having been placed in rotation in the proper direction for reproducing the side thereof as shown in Figure 2, the next action is to place into operative engagement with the record a suitable pick-up device. In this instance the pick-up device is an electric pick-up which is designated in its entirety at 147. The details of construction of the electrical pick-up 147 are not involved in this application and hence such details will not be described. It may be understood, however, that the device is of a suitable operative type designed to be connected with electrical amplification and reproducing apparatus such as is well known in the art.

The pick-up device is connected by suitable flexible connections to such mechanism and it is carried by an arm 148 (see Figures 2, 23, 24 and 25) which extends from a sleeve-like member 149 which is slidably mounted on a rod 150. The rod 150 is mounted in a fixed position in suitable lugs or ears 151 and 152 which extend from the side member 45 and, as shown in Figure 2, said rod is arranged at a slight angle from the horizontal, so as to have a tendency to cause the member 149 to slide downwardly along said rod. The inclination, however, is not sufficient to cause the member 149 to move along the rod without some additional force but it should be sufficient to approximately overcome normal frictional resistance to movement of the member 149 along said rod in the downward direction.

The pick-up member 147 is adapted to engage the adjacent face of the record R through an opening 153 in the side member 45, but during the delivery of a record from the magazine to reproducing position, the pick-up member is held in an outwardly disposed position so as to avoid interference with the movement of the record into said reproducing position.

For holding the pick-up member in such outwardly disposed position, the carrier 149 is provided with an upwardly extending pin 154 which is adapted to engage the arm 155 of a bail-like member, the end arms 156—156 of which are pivoted at their lower ends as indicated at 157 to suitable ears or lugs preferably formed integrally with the side member 45.

Figure 24:
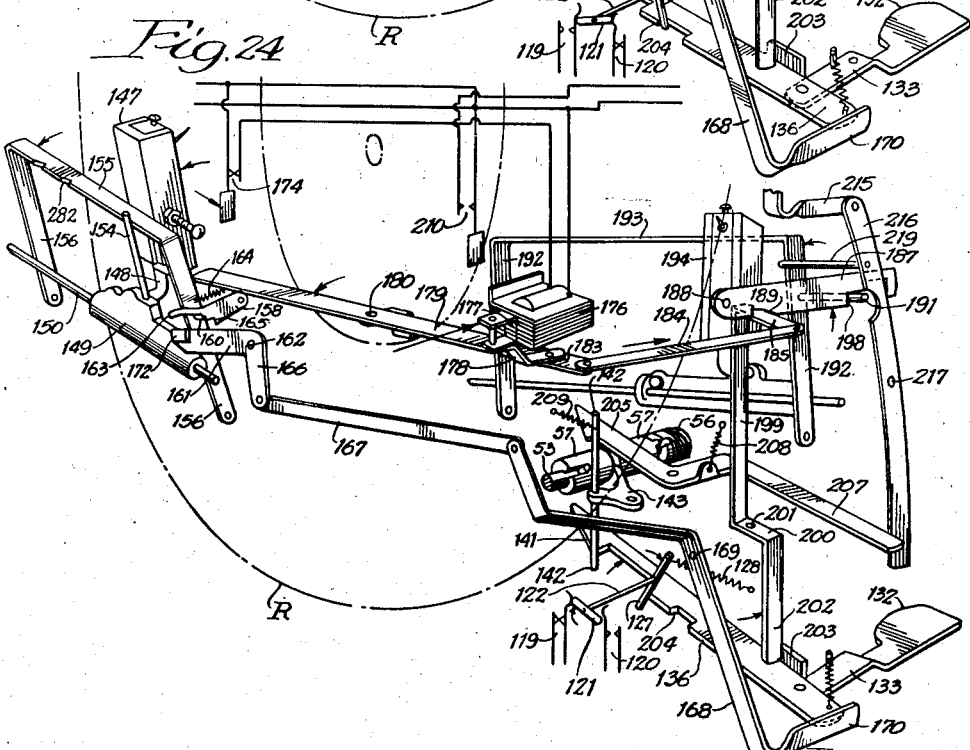

The bail-like member is initially held in an outwardly rocked position as indicated in Figures 24 and 25 by means of a latch member 158 which is suitably pivotally mounted on an ear or the like carried by the side member 45. The latch member is equipped with a shoulder 159 which engages a pin 160 projecting from one of the arms 156 of the bail-like member for holding the latter in outwardly rocked position.

The weight of the pick-up member 147 is disposed more or less inwardly of the supporting rod 150 so that it normally tends to move by gravity into engagement with a record but such movement is restrained by engagement of the pin 154 with an edge of the part 155 of said bail-like member.

The latch member 158 is adapted to be moved upwardly by means of one arm 161 of a bell crank which is pivotally mounted as indicated at 162 on the side member 45. Said arm 161, upon upward rocking movement, is adapted to engage an extension or finger 163 of the latch 158 to raise the same so as to permit said pin 160 to move past the shoulder 159. A light coil spring 164 is provided for urging the bail member to move inwardly until the pin 160 thereof engages a second shoulder 165 of said latch 158 for limiting the inward movement of the bail member. The extent of movement permitted the bail-like member is such that the upper arm 155 thereof will not normally be engaged by the pin 154 when the pick-up member 147 is in operative engagement with a record, it being understood that there is ample space between the pin 154 and the adjacent face of the pick-up member 147 to permit the establishment of a slightly spaced relation between the arm 155 and the pin 154, while also maintaining a spaced relation between said arm and the adjacent face of the pick-up. Thus mechanical contact between the arm 155 and any portion of the pick-up structure is avoided during the engagement of the pick-up with a record for reproducing purposes.

The bell crank 161 is adapted to be rocked upwardly by having its other arm 166 connected by means of a link 167 to one end of a rock lever 168 which is pivoted intermediate its ends as indicated at 169 on a portion of the frame member 45. The other end of said rock arm 168 is bent and so positioned as to have a portion 170 thereof disposed in the path of movement of the adjacent, projecting end portion of the member 136.

By inspection of Figures 26 and 27, it will be seen that while the rock arm 133 is held in an adjusted position by the crank pin 131, the end 171 of the member 136 is spaced from the end portion 170 of the rock lever 168. However, when the spring 139 is permitted to rock the member 133, said end 171 engages the arm portion 170 with a kicking action so as to thereby transmit a like kicking action to the bell crank arm 161 which in turn disengages the latch 158 from the pin 160 of the bail-like member. Hence, the pick-up member 147 is permitted to move by gravity into operative relation to the record.

In the normal position of the structure when the parts are disposed as shown in Figure 27, the bell crank arm 161 is spaced downwardly from the overlying projection 163 of the latch 158. The said bell crank arm 161 is preferably weighted as indicated at 172 so as to amplify the momentum of the bell crank arm imparted thereto in the manner already explained. Thus it will be understood that although there is no cam or other means for positively moving the bell crank arm 161 upwardly to an extent sufficient to disengage the latch 158 from the pin 160, adequate and effective provision is made for disengaging the latch with an action which is almost an instantaneous or snap action, which is considered advantageous.

The pick-up member 147 is such that it follows the sound track of the record being reproduced, the pick-up being accordingly moved inwardly toward the center of the record. The advancing side of the pick-up is provided with a projecting member 173, preferably adjustable as to its extent of projection, which is adapted to engage and close an electric switch 174, the member 173 being adapted to engage a switch part 175. Said member 173 is adjusted and said switch 174 is so positioned that the switch will be closed when the pick-up 147 receives inward movement from a final, usually accelerated, spiral groove which is an extension of the sound track of the record.

Figure 23:
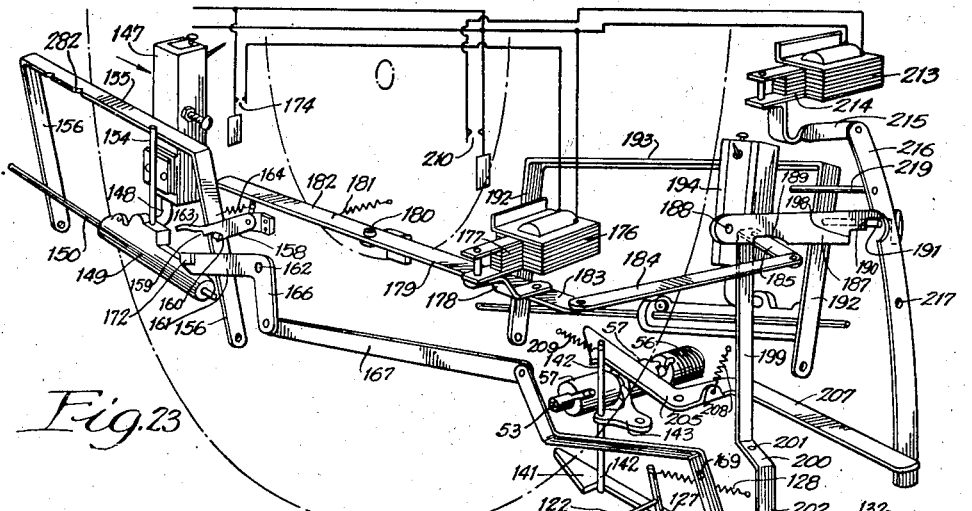

When the switch 174 is closed, an electric circuit is completed to a solenoid 176, the latter being suitably mounted on the side frame 45. The solenoid 176 when not energized, has its plunger 177 extended as indicated in Figures 23 and 25. Said plunger is connected by means of a link 178 to a lever 179 which is pivoted intermediate its ends as indicated at 180 on a suitable bracket or lug carried by the side member 45. A coil spring 181 stretched between a portion of the lever 179 and the side member 45 serves to normally rock said lever 179 in such a direction that the solenoid plunger 177 is held in said outwardly disposed position.

When the solenoid 176 is energized, the plunger 177 thereof is pulled inwardly with the result that the lever 179 is rocked so as to cause its end portion 182 to move outwardly in engagement with the leg 156 of the bail member, thereby to rock the latter outwardly. Incident to such outward movement of the bail member, the pick-up 147 is rocked outwardly so as to disengage it from the record, such movement being transmitted to the pick-up from the arm portion 155 of the bail and through the pin 154.

When the bail member 155—156 is thus rocked to its predetermined, outwardly adjusted position, the latch 158 is permitted to drop so as to cause its shoulder 159 to again engage the pin 160 to lock the bail in its outwardly disposed position, thereby holding the pick-up member 147 out of engagement with the record. The spring 164 is preferably connected at one end to one of the legs 156 of the bail member 155—156, and at its other end to a portion of the latch 158, so that said spring serves the double purpose of urging the bail to move inwardly and the latch to rock downwardly.

The other end 183 of the lever 179 moves inwardly and is connected by means of a link 184 to an arm 185. The arm 185 is pivoted as indicated at 186 on a suitable lug projecting from the other side member 46 and said arm 185 controls a latch member 187 which is pivoted as indicated at 188 to a conveniently accessible portion of the side member 46. The latch member 187 is provided with a notch 189 which initially receives the arm 185 so as to permit a shoulder 190 formed adjacent the outer end of the member 187 to engage a pin 191 which projects from the adjacent leg 192 of another bail-like member. The second bail-like member is associated with the side member 46 and includes a top arm 193 and the legs 192, 192 which are pivotally secured adjacent their lower ends to the side member 46, substantially in the same manner that the legs 156 of the bail arm 155 are pivoted to the side member 45.

The bail-like member 192—193 is associated with and serves to control a second pick-up member 194 in substantially the same way that the pick-up member 147 is controlled. Accordingly, said pick-up member 194 is carried by a mounting member 195 which is slidably mounted on a slightly inclined rod 196. A pin 197 projects upwardly from said member 195 for engagement with the outside edge of the portion 193 of said bail member.

When the solenoid 176 is energized, the arm 185, through its link connection 184 with said solenoid, is caused to rock in a counter-clockwise direction when viewed from above. Incident to such rocking movement of the arm 185, it engages the cam-like recessed edge of the latch 187 which forms the notch 189 and effects upward movement of the latch about its pivot 188 to an extent sufficient to disengage the latch shoulder 190 from the pin 191. The bail member 193 is then permitted to rock inwardly until its pin 191 engages the limiting shoulder 198, provided on the latch 187 and the pick-up member comes to rest in operative engagement with the second side of the record to be reproduced. It will be apparent that the operation of changing from one side of the record to the other is but a momentary operation, so that there is an almost imperceptible interruption in the reproduction of both sides of the record.

The arm 185 is extended downwardly by means of a portion 199 and again outwardly by means of a portion 200 which is substantially parallel with the arm 185 and is pivoted as indicated at 201 co-axially with the pivot 186. The arm 200 is again extended downwardly by a portion 202, the lower end portion of which is adapted to engage an ear 203 extending upwardly from a portion of the member 136 (see Figures 23 to 27, inclusive).

Incident to the rocking movement of the arm 185 under the influence of the solenoid 176, said extension 202 will engage the ear 203 to thereby rock the member 136 in a clockwise direction when viewed from above. Such rocking movement imparted to the member 136 is sufficient in extent to move the shoulder 204 out of engagement with the lower end of the pin 127, so as to permit the spring 128 to rock the shaft 122. When the shaft 122 is thus rocked by the spring 128, the cross-arm 121 is correspondingly rocked and operates to close the circuit controlled by the switch 120 and to open the circuit controlled by the switch 119, thereby reversing the direction of rotation of the motor 42, with the result that the record R is then rotated in the proper direction for reproducing the second side thereof.

Since the reversing switch operation is controlled by the movement of the arm 185 which controls the latch 187 and placement of the pick-up 194 in operative relation to a record, it will be understood that the change of direction of rotation of the record will be effected substantially simultaneous with the establishment of reproducing contact between said pick-up 194 and the record.

As an incident to the rocking movement effected as last described of the member 136, its hooked end 141 is disengaged from the pin 142 of the clutch-controlling bell-crank 143. An auxiliary control hook 205, however, serves to retain the clutch-controlling member 143 in the position illustrated in Figure 27 to hold the clutch in disengaged condition. Said auxiliary clutch-controlling hook 205 is pivoted as indicated at 206 in the bracket structure on which the lever 133 is pivoted and said hook has a tail or extension 207. A spring 208 connected between a portion of said auxiliary hook and a portion of said bracket serves to normally urge the hook into operative engagement with the pin 142. Another spring 209 normally urges the clutch-controlling bell crank 143 to move the clutch into operative engagement.

Upon completion of the reproduction of the second side of the record, another electric switch 210 is closed by engagement of a portion 211 thereof by a suitable projection 212 carried by the pick-up 194. The switch 210 controls an electric circuit to another solenoid 213, the latter being suitably mounted on the side member 46.

The solenoid 213 has a plunger 214 which is pulled into the solenoid when the latter is energized by closing of said switch 210, and said plunger 214 is connected by means of a link 215 to the upper end of a lever 216 which is pivotally mounted intermediate its ends as shown at 217 on a suitable bracket or ear portion 218 of the side member 46 (see Figures 1, and 23 to 25, inclusive).

The lower end of said lever 216 is arranged to engage the adjacent tail portion 207 of the auxiliary hook 205. When the solenoid 213 is energized, the lever 216 will rock the hook 205 against the tension of the spring 208 so as to disengage the hook from the pin 142, thereby to permit the spring 209 to actuate the bell crank 143, so as to effect engagement of the clutch sleeve 57 with the worm gear 56. The cam shaft 60 will thereupon be caused to rotate in clockwise direction as indicated by the arrow in Figure 27.

The lever 216 is equipped near its upper end with a projecting pin 219 which extends inwardly across the inner edge of the adjacent leg 192 of the bail-like member which controls the pick-up 194. Hence, when said lever 216 is rocked as an incident to actuation of the solenoid 213, the bail-like member 192—193 will be rocked outwardly and caused to engage the upstanding pin 197, so as to thereby rock the pick-up member 194 outwardly from engagement with the record R, the reproducing of which has just been completed. When the bail-like member 192—193 reaches its predetermined, outwardly adjusted position, the latch 187 will be permitted to drop so as to cause its shoulder 190 to again engage the pin 191 to hold the pick-up member 194 in its outwardly adjusted position. A suitable spring 220 may be connected between the latch 187 and the lever 216 in such a way as to induce downward movement of the latch 187 and also inward movement of the bail member 192—193, so as to maintain the latter in its inwardly adjusted position as determined by the latch shoulder 198 when the second side of the record is being reproduced.

Incident to rotation of the shaft 60 and the cam disc 61 thereon, the cam 115 (see Figure 22) will be rotated and will promptly permit the roller 114 carried by the lever 112 to drop into the recessed part of said cam 115 under the influence of the springs 116 and 117 (see Figures 18 to 21, inclusive). Said springs also serve to effect withdrawal of the record-centering pin 99 and outward movement of the record-clamping disc 104, so as to release the record which thereupon drops downwardly and comes to rest on the cushioned supporting studs 85, 85. Said cushioned studs 85, 85 occupy a lowered position during the reproduction of the record for the reason that the cam 98 is so shaped and proportioned as to hold said supporting studs in elevated position only for a short interval or until the centering pin has been caused to enter the center opening of the record so as to be capable of supporting same in its operative position. The cam 98 thereupon permits said supporting studs to drop downwardly to initial lowered position so as to be free from the record during its rotation for reproducing purposes.

Rotation of the cam shaft 60 and the cam disc 61 carried thereby also serves to again set in operation the record-transferring mechanism, this time for the purpose of returning the record from reproducing position to the storage space, in the magazine, from whence it came. Accordingly, the cam 62, after the record has been permitted to drop to the supporting studs 85, 85, serves to rock the lever 66 in a clockwise direction as viewed in Figure 9 to thereby rock the lever 73 toward the left from the dotted line position to the full line position as shown in Figure 6.

To reduce somewhat the extent to which the record drops to the supporting members 85, 85, the latter are momentarily elevated in properly timed relation for that purpose by means of a cam 259 carried by the cam disc 61 (see Figures 14 and 15).

Incident to the rocking movement of the lever 73 and the connections heretofore described, the record-engaging lever 86 will move inwardly and start the record R toward the magazine.

When the record R has been moved to a predetermined extent toward the magazine, the track 83 is rocked in a counter-clockwise direction from its inclined position shown in dotted lines to its oppositely inclined position as shown in full lines in Figure 6. Such rocking movement is effected by a cam formation 221 on the member 80 which is moved in unison with the link 76. Said track member 83 thus serves to elevate the record slightly and to cause it to continue its return movement under the force of gravity until it reaches its place in the magazine.

The member 130 carried by the shaft 60 has its periphery 222 so shaped as to constitute a cam adapted for operation against a roller 223 carried by a lever 224 which is suitably pivoted as shown at 225 on a lug or ear which extends from the adjacent side member 46. The lever 224 is connected by means of a link 226 to a latch member 227, the same being pivoted intermediate its ends as indicated at 228 (Fig. 1) on a conveniently accessible lug or ear formed as a part of the frame 31.

The link 226 is connected by means of a pin and slot connection as shown at 229, to the lower end of said latch member 227, and the upper end thereof is adapted to engage the notched bar 39 carried by the record magazine to lock the same in fixed position. During the reproduction of a record, the magazine is locked by said latch member, the cam 222 being then substantially in the position illustrated in Figure 3. Upon rotation of said cam 222 to the position shown in Figure 4, the cam acts on the roller 223 carried by the adjacent end of the link 226. The link 226 is thereby moved so that the latch member 227 is disengaged from the locking bar 39. In the event that the apparatus is to be coin-controlled, the coin-controlling arrangement should preferably be such that the operating cycle of the mechanism will be terminated while the latch member 227 is disengaged from the locking bar 39, so as to leave the magazine free for adjustment to position any desired record therein in position to be reproduced when the mechanism is again set in operation.

For permitting manual adjustment of the magazine for record selection purposes, there is provided a knob or hand wheel 230 carried by the upper end of a rod 231 which is journalled at its lower end in a bearing 232 formed integral with the frame 31 (see Figure 1). Said rod 231 has secured to it a ratchet wheel 233 and to the ratchet wheel there is secured a cam disc 234.

The cam disc 234 has its periphery suitably shaped and arranged to act against a roller 235 which depends from an arm 236, the latter being pivotally mounted as indicated at 237 on a shaft extending upwardly from the frame 31. Said arm 236 is connected to the record magazine by means of a lever 238 and a link 239, the lever 238 being pivotally mounted intermediate its ends as shown at 240 on the arm 236. The lever 238 is normally urged to swing on its pivot 240 by a spring 241 which is stretched between a pin 242 extending upwardly from the lever 238, and a pin 243 extending upwardly from an ear 244 which is formed integrally with the arm 236. An adjustable stop member 245 carried by the arm 236 is provided for limiting the movement of the lever 238 by the spring 241.

It will be seen that by turning the knob 230, the cam 234 will be rotated and will act against the roller 235 to effect rocking movement of the compound lever comprising the arm 236 and the lever 238 to thereby effect horizontal shifting movement of the record magazine. A spring 250 stretched between a portion of the arm 236 and a portion of the side member 46 normally urges the arm 236 to swing in such a direction as to maintain its roller 235 in operative engagement with the cam 234. The record magazine is very freely movable on its supporting tracks 34, 34, so that there is no tendency to stretch the spring 241 in adjusting the magazine when the same is not locked by the latch member 227.

In the event that the apparatus is not coin-controlled or is conditioned for extended operation, that is to say, for reproduction of a series of records without further attention, the record magazine is automatically shifted horizontally to the extent of the distance between adjacent record spaces in the magazine. For this purpose there is provided a pawl 246 which is pivotally connected as shown at 247 on the free end of the arm 224. Said pawl has its free end 248 arranged so as to be adapted to engage the teeth of the ratchet wheel 223, a spring 249 normally serving to urge the pawl into operative engagement with the teeth of said ratchet wheel. The extent of movement imparted to the arm 224 by the cam 222 is such that the pawl will rotate the ratchet wheel 223 to the extent of the distance between adjacent teeth and thereby rotate the cam 234 a corresponding amount. Said cam 234 is so shaped that when rotated to the extent indicated it will serve to adjust the record magazine in a horizontal direction, the distance between adjacent record spaces in said magazine. Hence, a new record will be positioned in alignment with the record-transferring means so as to be position for delivery from the magazine to reproducing position.

Because of the shape of the cam 234 and the pressure of the spring 250, there may be a tendency for said ratchet wheel and cam to be moved in a rearwardly direction of rotation. To overcome any such tendency, there is provided a dog 251 formed at the end of a spring arm 252, the latter being suitably mounted on a portion of the frame 31. Said dog 251 is adapted to engage the teeth of said ratchet wheel to prevent rearward rotation thereof.

In some instances it may be desirable to effect repeated reproduction of the same record. For that purpose there is provided a hand knob 253 carried by the upper end of a rod 254, the latter being rotatably mounted adjacent its lower end in a suitable bracket 255.

Said rod 254 has secured to it an arm 256 which has an end portion 257 turned downwardly so as to traverse an edge of the pawl member 246. By rotating the rod 254 through the agency of the hand knob 253, said arm 256 is operative to rock the pawl 246 to an outwardly adjusted position relative to the ratchet wheel 223. In such outwardly adjusted position, the pawl is disabled so that notwithstanding its endwise movement incident to the rocking of the arm 224, it will not actuate the ratchet wheel 223. Hence, the magazine will not be shifted so that the record, although returned thereto upon completion of the reproduction of the second side thereof, will be immediately returned to reproducing position. The rod 254 is provided at its lower end with a spring 258, the latter being compressed between the lower end of the bracket 255 and a washer suitably anchored on the rod, so as to produce a frictional resistance to turning of the rod 254. Hence, the rod and its arm 256 will be frictionally held in adjusted position.

During the time that a record is being reproduced, it is possible to select which of the other records contained in the magazine should be next reproduced. This is permitted by reason of the compound lever structure comprising the arm 236 and lever 238. As indicated in Figure 5, during such time as the magazine is held in fixed position by the locking member 227, the hand knob 230 may be manipulated so as to turn the shaft 231 in a clockwise direction, thereby rotating the ratchet wheel 233 and cam 234.

By means of a suitable index and a pointer arranged on the knob 230 or in connection therewith (not shown), the shaft 231 and parts associated therewith may be adjusted to select any desired record in the magazine. Such adjustment effects a braking of the compound lever arm, as indicated in Figure 5, without immediately effecting any adjustment of the record magazine.

When the record in reproducing position is returned to the magazine and the cam 222 so actuated as to effect unlocking of the magazine, the spring 241 will promptly effect shifting of the record magazine until the lever 238 resumes its normal position relative to the arm 236, as determined by the stop member 245. Thereafter, the normal movement of the cam 234 will be effected by the pawl 246 to shift the magazine one step which will bring the selected record into position for delivery to reproducing position.

Upon completion of the reproducing of the two sides of a record, the pick-up members 147 and 194 are located adjacent the ends of their inwardly directed paths of travel where the reproducing of the respective sides of the record was completed.

The pick-up devices 147 and 194 are returned to their initial or starting position for 10" records so as to be in readiness for engagement with the starting end of the sound groove of the adjacent face of the next record if the same is a 10" record.

For the purpose of returning the pick-ups to their initial position there are provided a pair of levers 260 and 261, respectively located on the outside of the side members 45 and 46. Each of said levers 260 and 261 is pivotally mounted as indicated at 262 near its lower end and on its adjacent side member 45 or 46. The lower ends of said levers are connected by means of springs 263 and 264, respectively, to the opposite ends of a rock arm 265 which is pivotally mounted intermediate its ends as shown at 266 on a suitably provided ear or lug formed integrally with a depending portion of the side member 46. Said rock lever 265 is also connected by means of a link 267 to the lower end of a rock arm 268 which is pivotally mounted intermediate its ends as shown at 269 on the side member 46.

The upper end of said rock arm 268 has an edge portion 270 adapted to be engaged by a pin 271 which projects laterally from the cam-actuated rock arm 95 (see Figures 1 and 10 to 13, inclusive).

As an incident to the rocking movement imparted to the arm 95 by the cam 259 for elevating the record supports 85 to receive the record released by the centering pin, the pin 271 on the lever 95 engages the edge 271 of the rock lever 268, thereby causing the latter to rock. The rocking movement of the arm 268 is transmitted to the cross-arm 265 and the swinging movement of the ends of the latter is in turn transmitted through the springs 263 and 264 to the respective rock arms 260 and 261.

The upper ends of the rock arms 260 and 261 are adapted to engage pins 272 and 273 which project from the pick-up mounts 149 and 195, respectively, and thereby transmit the outward swinging movement of said arms to the respective pick-ups. The extent of rocking movement imparted to the arm 95 by the cam 259 is such that the pick-ups are adjusted outwardly but not quite to their initial or starting position, final positioning being determined upon delivery of the new record to reproducing position in the mechanism.

When the new record is delivered, and assuming that it is a 10" record, the cam 98 carried by the disc 61 again actuates the rock arm 95, imparting a greater degree of rocking movement thereto than the cam 259. The movement of the rock arm 95 effected by the cam 98 is sufficient to elevate the new record to approximately its centered position, and such that the arms 260 and 261 are urged to rock outwardly to a greater extent than was caused by the cam 259.

Incident to the upward movement of the cross member 91 which carries the record-supporting studs 85, pins 274 and 275 projecting from said cross-arm co-axially with the respective studs 85 are adapted to engage the bevelled or cam ends 276 and 277, respectively, of the depending arms of bell cranks 278 and 279. The bell crank arms 278 and 279 are respectively pivotally mounted as indicated at 280, 280, on the outside of the side members 45 and 46, respectively. Each of said bell cranks includes horizontally extending arms having upwardly projecting hook-forming extensions 281, 281.

Incident to the upward movement of said roll-supporting studs 85, 85, and the co-axial pin extensions 274 and 275, respectively, said bell cranks 278 and 279 are rocked in opposite directions so as to cause their respective hook extensions 281 to move upwardly into the path of outward movement of the respective pick-up members 147 and 194. The respective pick-up members are thus limited in their outward movement to positions which constitute their initial or starting positions for 10" records.

It will be observed that the outwardly directed rocking movement of the arms 260 and 261 is stopped incident to the engagement of the pick-up members 147 and 194 with said bell crank stops, but that rocking movement of the cross-arms 265 is continued under the continued upward movement of the pin 271 on the rock arm 95. This condition is permitted since the extra movement of the cross-arm 265 is taken up in the springs 263 and 264.

The upper arms 155 and 193 of the respective bail-like members which control the pick-up devices are each provided with notches such as indicated at 282 which are adapted to receive the upper end portion of the upwardly extending pins 154 and 197, respectively, to thereby hold the pick-up in its initial position against the tendency of the pick-up to slide inwardly and downwardly on their respective inclined supporting rods. It may be noted that during the time the pick-up devices are being returned to their initial or starting positions, the bail-like members are locked in their outwardly disposed positions by the latches 158 and 187, respectively, and that the normal tendency of the pick-up members to rock inwardly about their respective supporting rods causes the upwardly extending pins 154 and 197 to enter said notches 282.

Upon downward movement of the record-supporting studs 85, 85, the various parts move in reverse directions and the bell crank members 278 and 279 are permitted to return to normal lowered positions under the influence of gravity, such positions being determined by suitable stop pins such as indicated at 283, 283, which project from the respective side members 45 and 46 for that purpose.

When a 12" record is delivered to the mechanism instead of a 10" record, the upward movement of the record by the supporting studs 85, 85 is of relatively limited extent and is stopped by a roller 284 which extends transversely across the edge of the record and is rotatably mounted on a portion of a rod 285 which extends upwardly from that side member 45. To facilitate adjustment of the vertical position of the roller 284, the rod 285 is mounted so as to be vertically adjustable in the side member 45, a suitable set screw or other means being provided for locking the rod in adjusted position.

As shown in Figure 13, a 12" record is in reproducing position, the same having been elevated by the supporting studs 85, 85 to the extent permitted by the roller 284. The rock arm 95, however, is actuated to the usual extent by the cam 98, the surplus movement with reference to the vertical movement of the member 92 and supporting studs 85, 85 being taken up by the coil spring 94 through which lifting movement is transmitted from the rock arm 95 to the member 92. Under this condition, the projecting pins 274 and 275 do not operate the bell cranks 278 and 279, so that their hook extensions 281 are not moved upwardly into the path of travel of the pick-up devices 147 and 194.

Incident to the described yielding means for effecting upward movement of the record-supporting studs 85, 85, the centering pin 99 is permitted to force the record downwardly slightly so as to disengage it from the stop roller 284. This is a desirable feature in that it facilitates the elimination of any mechanical contact between the edge of the record and the positioning member 284 when the record is co-axially positioned with reference to the driving and clamping discs 104 and 105.

Incident to the normal upward rocking movement imparted to the rock arm 95 by the cam 98, the pin 271 actuates the rock arm 268 and transmits the normal full movement to the cross-arm 265. The rock arms 260 and 261 thus receive their normal rocking movement which, not being stopped by the hooks 281, is permitted to continue until the pick-up members 147 and 194 are adjusted to their outermost or starting position for 12" records. Such outward movement may be limited by engagement of the outer ends of the respective pick-up carriers 149 and 195 with the ears or lugs 151 and 218, respectively, in which the respective rods 150 and 196 are mounted.

The relationship of the cam 98 to the clutch-controlling roller 131 is such that the clutch is disengaged very promptly after the cam 98 passes the roller 97. Hence, the rock arm 95 and parts actuated thereby are restored to their initial positions as indicated in Figure 10, it being understood that the weight of the vertically slidably mounted member 92 and parts carried thereby is adequate to cause the same to move downwardly to their initial positions under the force of gravity. It will be noted that there is no positive connection between the parts which are thus restored to initial position by gravity and the rock arms 260 and 261, so that there is no positive means for restoring the latter to their inwardly adjusted positions as shown in Figure 10. Positive connections for this purpose may be provided if desired but such a positive connection is not required since the members 260 and 261 offer no resistance whatever to return movement and will be restored as an incident to the inward movement of the respective pick-up devices, the respective pins 272 and 273 thereof then serving to push the said members 260 and 261 inwardly as indicated.

As a practical matter, after the respective arms 260 and 261 are adjusted to positions slightly inwardly of vertical positions, they fall by gravity to their full inwardly disposed positions as shown in Figure 10. The limit of inwardly directed movement of the rock arms 260 and 261 may be determined by any conveniently located stop means, or, for example, by engagement of their lower end extensions with transversely extending portions of the frame structure 31.

Upon disengagement of the clutch 57—56 as an incident to the rocking movement of the member 133 as permitted by the roller 131 (see Figures 26 and 27), the member 136 is moved outwardly or in such a direction that the end shoulder 204 of the notch 137 in said member 136 engages the pin 127 and thereby rocks the shaft 122 so as to actuate the electric switches 119 and 120 to reverse the direction of rotation of the motor-driven shaft 43, whereby the newly positioned record will then be rotated in the proper direction for reproduction of its first face by the pick-up 147.

For the purpose of guiding the records to their operative position between the side plates 45 and 46 and between the clamping discs 104 and 105, the inside faces of the side members 45 and 46 may be provided with guide members such as indicated at 45a and 46a (see Figure 18), as many of said guide members being provided as may be found desirable.

In the foregoing description, the operation of the mechanism has been followed through the entire cycle of operation beginning with the transmission of a record from the magazine to reproducing position, the reproduction of both its faces, its return to the magazine and the subsequent delivery of another record into operative or reproducing position. The arrangement whereby the same record may be immediately returned for repeated reproduction and also an arrangement whereby any record in the magazine may be selected either before the mechanism is placed in operation or during the reproduction of another record, have been explained. While it is not contemplated that for practical purposes means need be provided for facilitating selection of which face of the record shall be played, such means may be readily provided.

The described mechanism eliminates the relatively difficult and conventional operation of placing a record on a horizontal turn-table, removing it, inverting it, and replacing it on the turn-table for reproduction of both sides of the record. Furthermore, due to the vertical position of the record for reproducing purposes, the tendency to produce scratching noise incident to engagement of the pick-up needle in the bottom of the sound groove of the record is materially reduced, if not eliminated. The mechanism operates quietly and smoothly and the reproduction of opposite faces of a record is almost continuous, the interruption incident to the changing from one side to the other and reversal of the direction of rotation of the record being so slight as to be hardly noticeable.

Changes in the structure as shown and described may be made without departing from the principles of operation as explained and without departing from the spirit of the invention, the scope of which should be determined by reference to the following claims, the same being construed as broadly as possible, consistent with the state of the art.

I claim:

1. In automatic phonograph mechanism of the class described, the combination of a record magazine, means for mounting said magazine for horizontal shifting movement, means for automatically effecting shifting of said magazine comprising a cam, an arm pivotally mounted adjacent one end and having means for engaging said cam so as to be thereby rocked, and a connection between said arm and said record magazine comprising a lever pivotally mounted on said arm having an end portion linked to said record magazine, stop means carried by said arm for engagement with a portion of said lever for limiting pivotal movement in one direction of the lever relative to the arm, spring means for normally maintaining said lever in engagement with said stop means, and means for facilitating manual adjustment of said cam for effecting rocking movement of said arm, the pivotal connection between said lever and arm permitting rocking movement of the lever relative to said arm, thereby permitting preliminary setting of said arm to control shifting of the magazine, said spring means being operative to effect initial adjustment of the magazine incident to restoration of said lever to normal position relative to the arm and said cam member being operative to effect subsequent adjustment of said arm and lever to effect final adjustment of the magazine to selected position.

2. In an automatic phonograph wherein the records are stored and played in vertical planes, the combination of a record magazine, record rotating means, a vertically adjustable track adapted to be adjusted to inclined positions for causing a record to roll by gravity from said magazine to said rotating means and from said rotating means to said magazine, means for initially moving a record from said magazine to said track, a vertically movable member associated with said rotating means for receiving the records from said track in a lowered position relative to said rotating means, means for effecting upward movement of said member to position the record in substantially co-axial relation to said rotating means, and means for causing the record to move from said member to said track for return to said magazine.

3. In apparatus of the class described, the combination of record-rotating means, movable means for initially receiving a record out of co-axial alignment with said rotating means, a centering pin adapted to be positioned in axially spaced relation to said rotating means so as to permit a record to be positioned between said rotating means and said centering pin, yieldable means for actuating said receiving means to move the record toward and slightly past co-axially aligned relation to said rotating means, stop means for engaging and limiting such movement of the record, means for effecting adjustment of said centering pin into the normal axial hole of the record so as to center the same on said rotating means, said centering pin having its record hole entering end pointed and the pointed end thereof serving, upon entrance into said record hole, to cam the record to substantially co-axial relation to said centering pin and out of engagement with said stop means, and said actuating means being such as to effect retraction of said receiving means, thereby to leave the record in the control of said rotating means and centering pin.

4. In apparatus of the class described, the combination of record-rotating means, movable means for initially receiving a record out of co-axial alignment with said rotating means, a centering pin adapted to be positioned in axially spaced relation to said rotating means so as to permit a record to be positioned between said rotating means and said centering pin, yieldable means for actuating said receiving means to move the record toward and slightly past co-axially aligned relation to said rotating means, stop means for engaging and limiting such movement of the record, means for effecting adjustment of said centering pin into the normal axial hole of the record so as to center the same on said rotating means, said centering pin having its record hole entering end pointed and the pointed end thereof serving, upon entrance into said record hole, to cam the record to substantially co-axial relation to said centering pin and out of engagement with said stop means, said actuating means being such as to effect retraction of said receiving means, thereby to leave the record in the control of said rotating means and centering pin, and rotatable record engaging means associated with said centering pin and moved in unison therewith toward the record so as to clamp the same against said record rotating means for rotation thereby.

5. In apparatus of the class described, the combination of record-rotating means, movable means for initially receiving a record out of co-axial alignment with said rotating means, a centering pin adapted to be positioned in axially spaced relation to said rotating means so as to permit a record to be positioned between said rotating means and said centering pin, means for actuating said receiving means to move the record toward and slightly past co-axially aligned relation to said rotating means, stop means for engaging and limiting such movement of the record, means for effecting adjustment of said centering pin into the normal axial hole of the record so as to center the same on said rotating means, said centering pin having its record hole entering end pointed and the pointed end thereof serving, upon entrance into said record hole, to cam the record to substantially co-axial relation to said centering pin and out of engagement with said stop means, said actuating means comprising a yieldable member for transmitting movement thereto for moving the record as aforesaid and said yieldable member serving to permit preliminary retraction of said record receiving means as an incident to the camming effect of said centering pin on said record, and said actuating means being such as to effect further retraction of said receiving means, thereby to leave the record in the control of said rotating means and centering pin.

6. In apparatus of the class described, a record magazine adapted to support a record in an approximately vertical plane, means spaced from said magazine for rotating a record on a horizontal axis, means spaced from said magazine for initially receiving and positioning a record in predetermined relation to said rotating means, means for transporting a record between said magazine and said receiving means while maintaining the record in said vertical plane, said means comprising a track member extending between said magazine and said receiving means and mounted for adjustment to oppositely inclined positions for causing the record to roll by gravity downwardly along said track, to and from said receiving means, means for advancing the record horizontally from said magazine and receiving means respectively to said track, and means for successively effecting adjustment of said track to oppositely inclined positions so as to effect transportation of the record as aforesaid.

7. Automatic phonograph mechanism according to claim 6, wherein said track adjusting means is connected to and operated as an incident to the operation of said record advancing means.

8. In automatic phonograph mechanism of the class described, the combination of means for rotating a record on a horizontal axis, a record magazine spaced horizontally from said rotating means, means for propelling a record horizontally edgewise from said magazine to a position in which the axis of the record is disposed below and approximately in vertical alignment with the axis of said record rotating means, vertically adjustable means adapted to receive the record in said last mentioned position, stop means for engaging the periphery of large sized records when elevated to substantially co-axial relation to said record rotating means, automatically operable elevating means for effecting upward movement of said receiving means a distance sufficient to elevate a smaller record to substantially co-axial relation to said rotating means, said elevating means comprising a yieldable element through which lifting force is transmitted to said receiving means, said yieldable element being operative to permit said record receiving means to remain stationary when a large record thereon engages said stop means while said elevation means continues to move a predetermined distance required for elevating a smaller record to said co-axial position, means for effecting operable engagement of said record rotating means with a co-axially positioned record, and means for lowering said receiving means for effecting disengagement thereof from the record to free the record for rotation.

9. In an automatic phonograph, the combination of means for rotating a disc record on a horizontal axis, a pair of pick-ups respectively mounted for movement toward and from the opposite faces of a record carried by said rotating means and for movement across the sound track areas of such a record in accordance with the requirements of the inward spiral of the sound tracks, the mounting for said pick-ups comprising also an arrangement whereby each pick-up is normally urged to move toward and into operative engagement with the record, latch means for each pick-up and operatively connected therewith to position the same in spaced relation to the record, means for actuating one of said latch means so as to release the pick-up held thereby for movement toward and into engagement with the record, means adapted to be actuated by said released pick-up upon completion of predetermined movement thereof across the record for restoring said released pick-up to spaced relation to said record, and means actuated as an incident to the actuation of said pick-up restoring means for actuating the other of said latch means so as to release the other pick-up for movement into engagement with the record.

10. An automatic phonograph according to claim 9 wherein the means for rotating the record is reversible, and wherein there is provided means automatically actuated, as an incident to the operation of said pick-up restoring means and said other pick-up releasing means, for effecting reversal of the direction of rotation of said rotating means.

11. An automatic phonograph according to claim 9 wherein the means actuated by the pick-up upon completion of predetermined movement across the record is electrically actuated, and wherein there is provided an electrical switch adapted to be actuated by said pick-up for controlling the energizing circuit of said electrically actuated means.

12. An automatic phonograph according to claim 9 wherein there is provided a record magazine in spaced relation to said record rotating means, means for transferring a record from said magazine to said rotating means and back to said magazine, means actuated by said other pick-up upon completion of predetermined movement thereof across the record for restoring said other pick-up to spaced relation to the record, and means also actuated by said other pick-up upon completion of said movement thereof across the record for effecting operation of said record transferring means to transfer the record from said rotating means to said magazine.

13. An automatic phonograph according to claim 9 wherein there is provided means actuated by said other pick-up upon completion of predetermined movement thereof across the record for restoring said other pick-up to spaced relation to the record, and means for simultaneously returning both of said pick-ups to starting position.

JOHN GABEL.